May 5, 1931. J. B. FREYSINGER 1,804,377
SNAP HOOK WITH SWIVEL
Filed Feb. 18, 1930
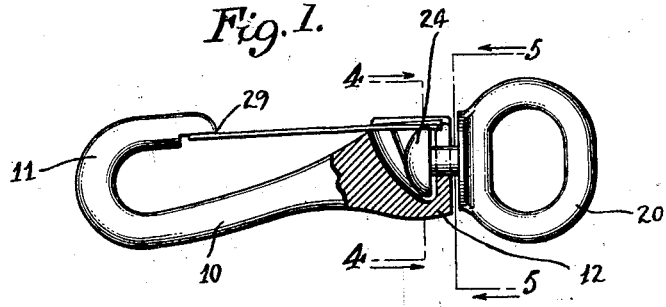
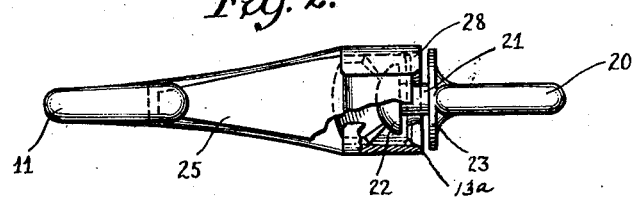
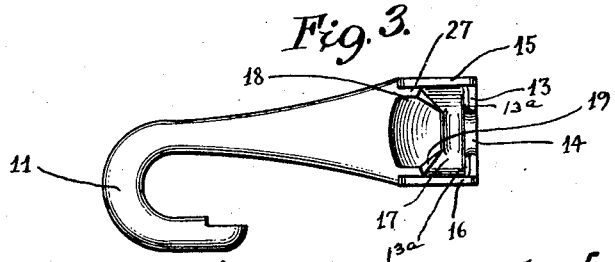
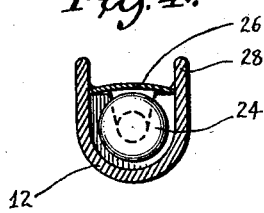
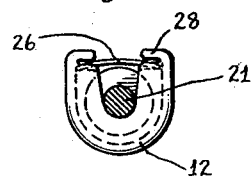
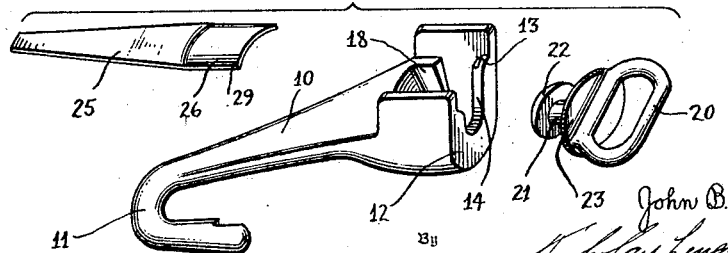
Inventor
John B. Freysinger
By
his Attorney Patented May 5, 1931

1,804,377

UNITED STATES PATENT OFFICE

JOHN B. FREYSINGER, OF NEW BRITAIN, CONNECTICUT, ASSIGNOR TO NORTH & JUDD MANUFACTURING COMPANY, OF NEW BRITAIN, CONNECTICUT, A CORPORATION OF CONNECTICUT

SNAP HOOK WITH SWIVEL

Application filed February 18, 1930. Serial No. 429,409.

This invention has to do broadly with the art of snap hooks and more specifically involves those snap hooks which have associated therewith, as an essential part thereof, a swivel connecting member.

A typical prior art device of this class comprises a main hook member which has the spring snap anchored thereto. The swivel member is operatively fastened to the hook member by a connection which is independent of the snap anchorage.

The present invention evidences recognition of the fact that the swivel fastening and snap anchorage may be advantageously combined to provide a simplified and compact device which is manufactured and assembled with an ease heretofore unattained.

Other objects will be in part obvious and in part pointed out more in detail hereinafter.

The invention accordingly consists in the features of construction, combination of elements and arrangement of parts which will be exemplified in the construction hereinafter set forth and the scope of the application of which will be indicated in the appended claims.

For a full and more complete understanding of the invention, reference may be had to the following description and accompanying drawings, wherein:

Figure 1 is a side view of a snap hook with swivel made in accordance with the present invention, parts being broken away and shown in section to more clearly bring out the details.

Figure 2 is a plan view of the device shown in Figure 1 with parts broken away and shown in section.

Figure 3 is a plan view of the hook member at one stage of its manufacture.

Figure 4 is a cross section through the device and is taken about on the plane indicated by the line 4—4 of Figure 1.

Figure 5 is another section somewhat similar to Figure 4, but taken about on the line 5—5 of Figure 1, and Figure 6 is a showing of the individual components of the device, these parts being developed in perspective.

Referring now to the drawings, and more particularly to Figure 1, a snap hook and swivel such as proposed by this invention is shown as comprising a main body or hook member 10 to which is fastened the spring snap and swivel. The member 10 is formed with a hook 11 at one end and a construction referred to generally as 12 at the other end which anchors the snap and operatively connects the swivel with the member 10.

This construction 12 comprises an end wall 13 having an open recess or notch 14 therein and side walls 15 and 16. These side and end walls, together with the main body of the member 10, define a recess and constitute what is in effect a housing for the swivel connection as shown at 17. Integrally formed in the housing 17 are ribs 18 having curved edges or shoulders 19 and upper flat edges 27. The purpose of these ribs will be hereinafter described more in detail.

The swivel member consists of an eye 20 which is integrally connected with a shank 21 which in turn is formed with a head 22 which has a flat surface and a curved or spherical surface 24. A disc member 23 is integrally formed with the remainder of the swivel construction and is located between the eye 20 and the shank 21.

When the swivel is assembled with the hook member 10 the disc 23 is loosely engaged with or slightly spaced from the exterior surface of the end wall 13 while the flat surface of the head 22 is in a corresponding relation with the interior surface of the wall 13. The spherical surface 24 rests on the curved edges 19 of the ribs 18 and as the shank 21 is located in the notch 14 the eye 20 is permitted to swivel with respect to the hook member 10.

A spring snap 25 has one end slightly deformed into an arcuate formation as shown at 26 and the side edges of this arcuate portion rest on the upper edges or shouldes 27 of the ribs 18 while the end of the arcuate portion 26 seats on ledges 13a formed in the end wall as clearly shown in Figures 1, 3, and 6. The portion 26 has straight sides 29 which are in a slightly tapered relation. The edges 27 of the side walls are tapered in a corresponding manner, that is they are spaced wider apart adjacent the end wall 13. The upper portions of the side walls 15 and 16 are turned over to provide retaining flanges 28 which anchor the snap 25 in proper position. The taper on the edges 29 and flanges 28 hold the snap 25 against longitudinal movement. The portion 26 of the snap 25 serves as a covering for the housing 17 and maintains the connection with the swivel eye 20. This combining of the anchorages of the snap and swivel provides for a shortened and compact arrangement as compared with the prior art devices wherein the snap and swivel were independently anchored and which condition of course made for a longer device than is hereby provided.

The hook 11 is undercut as shown at 29 to provide a flattened surface against which the free end of the snap 25 bears.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

What is claimed as the invention is:

1. In a fastening device of the character described, a hook member formed with a recess at one end having an end wall and side walls, the end wall having a notch therein, flanges at the upper ends of the side walls and shoulders at the bases of said flanges, an eye member having a shank extending through the notch and a head engaging in said recess, and a spring snap operatively assembled with respect to the hook member and having a portion resting on said shoulders and engaging said end wall, said flanges being inturned over the side edges of said spring snap whereby the same is held between the flanges and said shoulders.

2. In a fastening device of the character described, a hook member formed with a recess at one end having an end wall and side walls, said end wall having a notch therein and ledges adjacent its upper end, said side walls having at their upper ends flanges and internal shoulders at the bases of the flanges, the opposed faces of said flanges being slightly tapered towards each other as they progress away from said end wall, an eye member having a shank extending through the notch and a head in said recess, and a spring snap operatively assembled with respect to the hook member and having a portion resting on said ledges and shoulders and closing said recess, said portion of said snap being tapered correspondingly to the relative inclination of said flanges and said flanges being bent towards each other over said portion of said snap to hold the same against said ledges and shoulders.

JOHN B. FREYSINGER.